United States Patent [19]
Smith

[11] Patent Number: 4,512,416
[45] Date of Patent: Apr. 23, 1985

[54] FLAT FOLD IMPLEMENT FRAME
[75] Inventor: David R. Smith, Hesston, Kans.
[73] Assignee: Hesston Corporation, Hesston, Kans.
[21] Appl. No.: 431,008
[22] Filed: Sep. 30, 1982
[51] Int. Cl.³ .............................................. A01B 73/00
[52] U.S. Cl. .................................... 172/776; 172/311;
172/466; 172/501
[58] Field of Search ............... 172/311, 446, 456, 501,
172/502, 662, 776, 466

[56] References Cited
U.S. PATENT DOCUMENTS

| | | | |
|---|---|---|---|
| 3,948,327 | 4/1976 | Parker et al. | 172/311 |
| 4,047,575 | 9/1977 | Wagner | 172/311 |
| 4,178,998 | 12/1979 | Rockwell | 172/501 X |
| 4,232,747 | 11/1980 | Pfenninger et al. | 172/311 |
| 4,328,869 | 5/1982 | Perelli | 172/311 |

*Primary Examiner*—Richard T. Stouffer
*Attorney, Agent, or Firm*—Schmidt, Johnson, Hovey & Williams

[57] ABSTRACT

The normally horizontal frame of a wheeled farm implement, such as used for tillage purposes, has a center section at the ends of which are hinged a pair of wing sections that are fully foldable into overlying, substantially parallel relationship to the center section through use of hydraulic cylinder assemblies. At each hinge a pair of links, pivotally connected to corresponding hinge straps, have a common pivotal connection at their upper ends with the piston rod of the cylinder. A pintle-receiving slot, strategically located in the wing section hinge strap not only permits limited rise and fall of the wing section over uneven terrain but causes smooth swinging movements of the wing sections to and from their folded conditions. Entirely eliminated is free falling of the wing sections because of constant control by the hydraulic assemblies made possible by abutment at all times of the spring-loaded pintles against one end of the slots. Such construction completely avoids jolting and jarring of the frame parts and other implement components during folding and unfolding operations, thereby preventing damage to the implement and injury to the operator.

10 Claims, 8 Drawing Figures

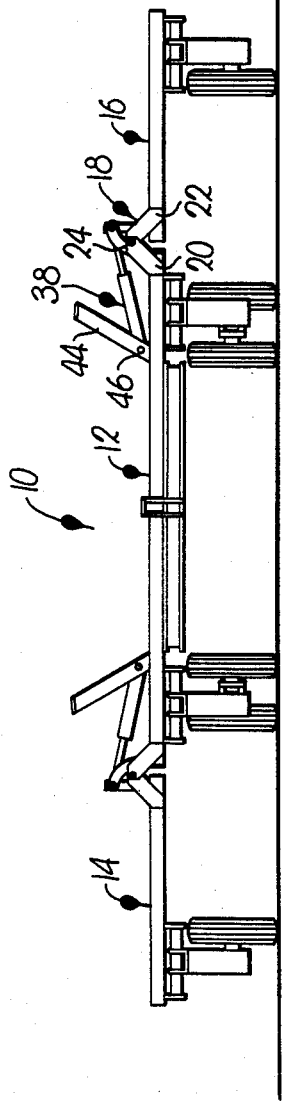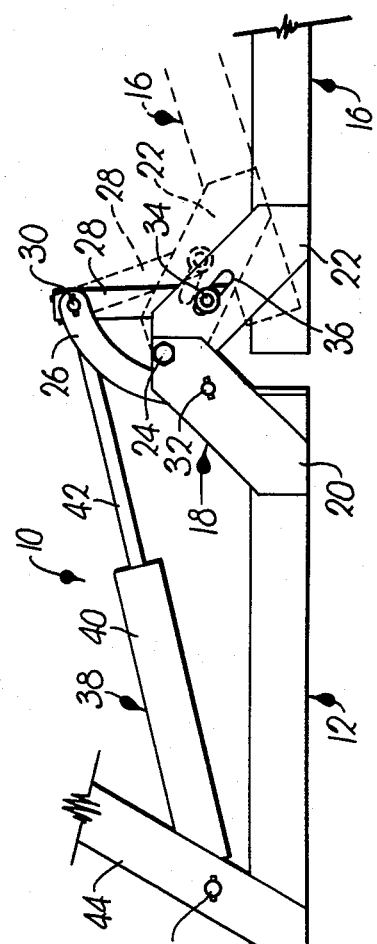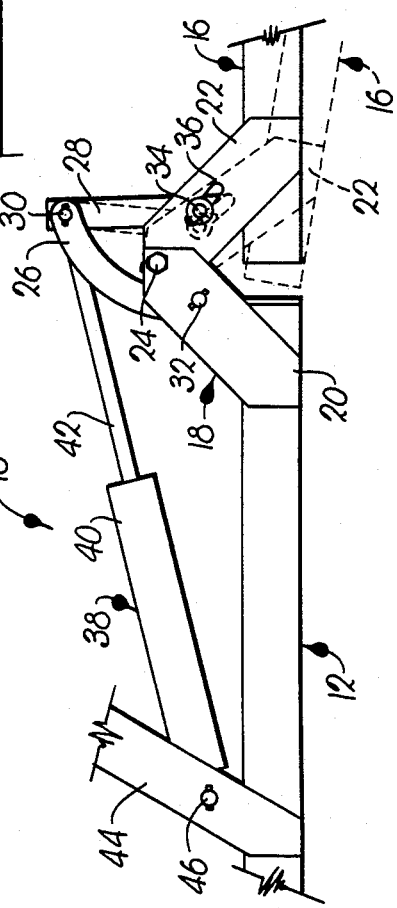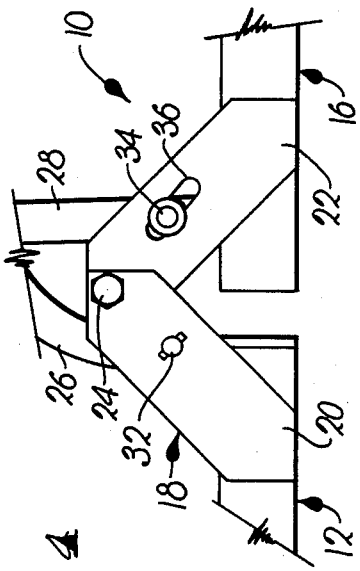

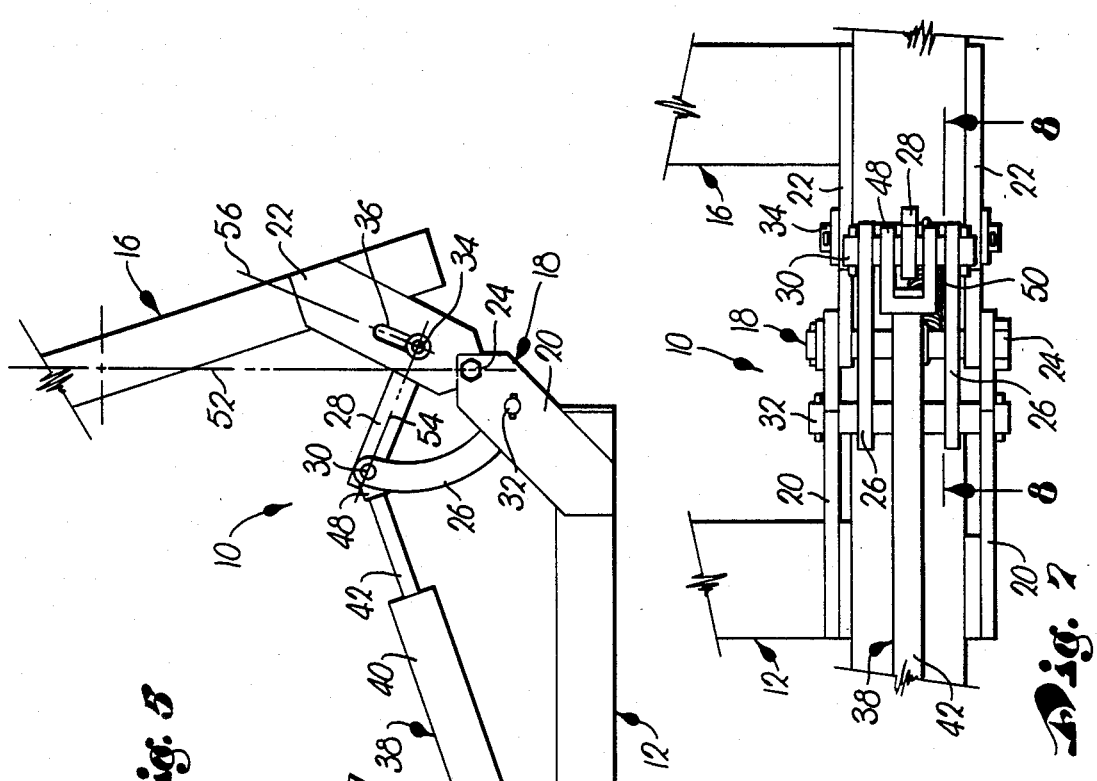
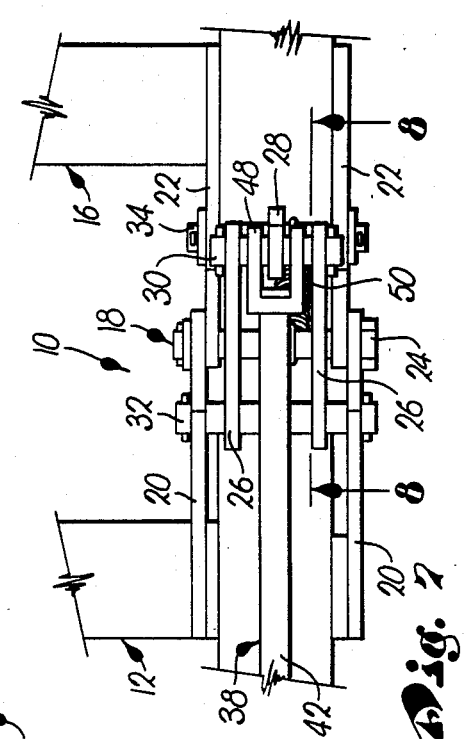
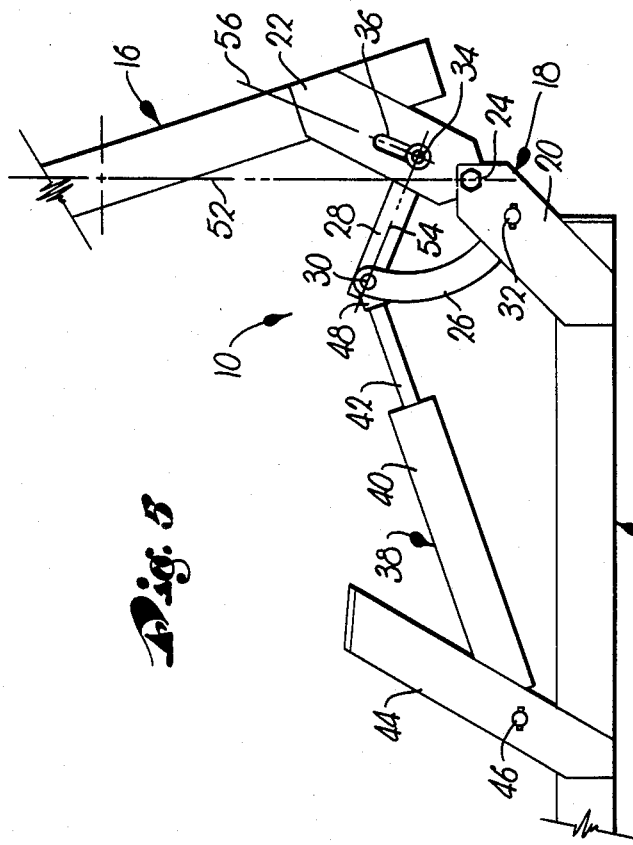
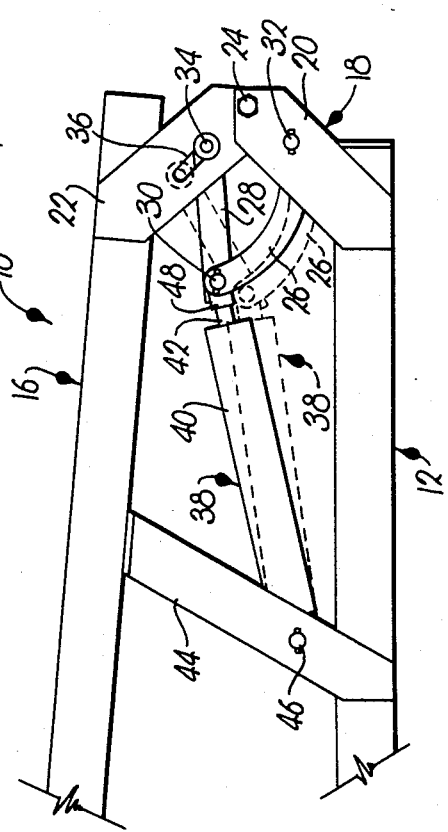

FLAT FOLD IMPLEMENT FRAME

Farm implements, especially those structured for tillage purposes, having a sectional wheel-supported frame, including a center or main frame and two or more wing or outrigger sections, are today well known and widely used. Conventionally also, the hingedly connected outer sections are foldable, at least in part, to permit passage of the implement through gates and over-the-road travel. Further, it is common in some cases to provide means for permitting a certain amount of flotation of the winged sections during use in the field in response to uneven terrain. Additionally, among the prior suggestions for folding the outriggers, is the use of fluid pressure power in the form of pistons reciprocable in hydraulic cylinders.

Several flat fold wing mechanisms are currently available and provide smooth folding action. However, many of such mechanisms are rather complicated and are costly and difficult to manufacture. Furthermore, many involve intricate pins and links for locking devices which can present severe wearing problems during field operations.

Additionally, some of the current designs provide for floating up-and-down movement of the wing sections during field operations by allowing the ram of the lift cylinder to jossle back and forth within the cylinder as the wing section encounters terrain variations. In those constructions the cylinders remain firmly connected to the wing sections after unfolding instead of using a pin and slot connection or the like to allow the wing section a certain amount of lost motion relative to the cylinder to the extent permitted by the opposite extremes of the slot. This places significant wear and stress on the seals associated with the ram and promotes early failure of those components.

The present invention is directed to an arrangement which essentially disconnects the wing section from the hydraulic cylinder when the wing has been unfolded to the extent permitted by a pin and slot connection such that the wing section can float up-and-down without having an effect upon the seals of the lift cylinder. Yet, at the same time, the invention avoids any free-fall of the wing section during folding or unfolding which might otherwise tend to occur because of the freedom of movement permitted by the pin and slot connection. The construction is uncomplicated without intricate pins, links and locking devices and thus may comprise easily manufactured parts which can be produced at standard manufacturing tolerances. The design is such that normal field wear will not impede the operation of the apparatus.

In this connection, the pin and slot components are so configured and arranged that once the pin has been positioned at one end of the slot, either for folding or unfolding, it stays at that end so that there is no free-fall of the wing section as the latter swings through a top-dead center position relative to the hinge point, thereby avoiding all of the negative effects of such free-fall including, for example, shock loading on the various components and the risk of personal injury.

Relevant in part to some components of my invention, though incapable of solving the problem here presented, is the structure disclosed in U.S. Pat. No. 3,948,327 of Apr. 6, 1976. Other U.S. patents of possible interest but of lesser materiality include: Nos.

3,460,631
3,568,777
3,633,680
3,650,333
3,692,1201
3,693,724
3,713,495
3,783,951
3,797,580
3,814,191
3,828,860
3,844,358
3,944,001
4,023,623
4,026,203
4,074,766

In the drawings:

FIG. 1 is an end view of a flat fold implement frame made according to my present invention;

FIG. 2 is an enlarged, fragmentary view, similar to FIG. 1, showing the hinge and associated parts of the center and one wing section of the frame, and illustrating by dotted lines partial descent of the wing section below its normal horizontal operating position;

FIG. 3 is a view similar to FIG. 2 showing by dotted lines partial ascent of the wing position above horizontal;

FIG. 4 is a view similar to FIGS. 2 and 3, still further enlarged showing the relationship of certain parts during normal use of the implement;

FIG. 5 is a view similar to FIGS. 2 and 3, showing the position of the wing section intermediate its path of swinging movement toward its fully folded condition;

FIG. 6 is a fragmentary end view of the frame showing one wing section fully folded above the center section;

FIG. 7 is an enlarged, fragmentary top view of one hinge and associated parts while the two frame sections are in their operating condition; and FIG. 8 is a fragmentary cross sectional view taken on line 8—8 of FIG. 7.

FIG. 1 of the drawings shows a normally horizontal, wheeled frame 10 of a farm implement, such as a field cultivator, chisel plow or other tillage machine, having a center or main section 12 and a pair of wing or outrigger sections 14 and 16, each adapted to have a number of tools (not shown) suspended therefrom for ground penetration as the frame 10 is towed across a field to be worked. The two connections between the sections 14 and 16 and the section 12 are identical; hence, only the components for sections 12 and 16 will be hereinafter described in relationship especially to FIGS. 2–8.

A hinge 18 extending upwardly from the frame has an elongated hinge strap 20 rigid to the section 12, an elongated hinge strap 22 rigid to the section 16 and a fore-and-aft hinge pin 24 pivotally interconnecting the straps 20 and 22 at their upper ends. The inclined straps 20 and 22 converge as the pin 24 is approached and, as shown in FIG. 7, each strap 20 and 22 has front and rear, spaced-apart components of identical nature.

A pair of links 26 and 28 extend upwardly from the hinge 18, one on each side respectively of the pin 24, and a pintle 30 pivotally interconnects the links 26 and 28 at their uppermost ends. Another pintle 32 pivotally connects the link 26 with the strap 20, and a third pintle 34 pivotally connects the link 28 with the strap 22. Once again, noting FIG. 7, the link 26 is in two parts, but the link 28 is a single member centered on pintle 30.

The strap 22 has an elongated slot 36, extending longitudinally of the strap 22 intermediate the ends of the latter, through which the pintle 34 passes to clear the pintle 34 for limited up-and-down swinging movement of the section 16 relative to the section 12 about the pin 24 during travel of the implement over uneven terrain, as shown by dotted lines in FIGS. 2 and 3. Stops (not shown) may be provided for limiting the extent of such swinging, either upwardly, downwardly or both.

A double acting, fluid pressure assembly 38, e.g. a hydraulic ram, having a cylinder 40 and a piston rod 42, overlies the section 12 between the pintle 30 and an inclined, upwardly extending stand 44 rigid to the section 12. The cylinder 40 is connected to the stand 44 by a pivot pin 46, and the rod 42 has a clevis 48 (FIG. 7) which receives the pintle 30. A coil spring 50 (FIGS. 7 and 8) interconnects the pin 24 and the pintle 34.

OPERATION

Upon retraction of the piston (not shown) within the cylinder 40 toward the pin 46, the section 16 is folded from the normal position shown in FIG. 1 about the pin 24 into overlying, substantially parallel relationship to the section 12 as shown in FIG. 6, resting on the stand 44.

The slot 36 is disposed for abutment of the pintle 34 against the normally uppermost end of the slot 36 as the rod 42 is initially retracted to lift the section 16 from its normal, horizontal operating position. While the spring 50 yieldably biases the pintle 34 toward the upper end of the slot 36, the holding of the pintle 34 against the upper end of the slot 36 is the result of the force imparted by the rod 42. The rod 42 exerts an initial pulling action on the section 16 through the pintle 34 until the section 16 reaches substantially the position shown in FIG. 5.

The length and the location of the slot 36 within the strap 22 should be such that, when the center of gravity of the section 16 is located above the pin 24, as shown in FIG. 5 (indicated by broken line 52), the longitudinal axis 54 of the link 28 will be perpendicular to a line 56 passing along the longitudinal axis of the slot 36.

Accordingly, as the section 16 continues to swing anticlockwise, viewing FIG. 5, it is no longer being pulled by the rod 42; instead, the assembly 38 restrains the section 16 and eases it down gently toward the stand 44, eliminating free-fall of the section 16 in total absence of any shock during the smooth transition of the section 16 from its upward, swinging movement to its downward, swinging movement. Furthermore, the section 16 comes to rest lightly on the stand 44 in absence of any jolt or hard, gravitational, noisy force, all because of the absence of a sloppy fit between the pintle 30, the link 28 and the clevis 48, and because of the constant engagement of the pintle 34 with that end of the slot 36 proximal to the pin 24 during the entire swinging of the section 16 from its operating to its folded condition as shown in FIG. 6.

As is clear also in FIG. 6, by dotted lines, by virtue of the arcuate nature of the link 26, the assembly 38 is disposed for effecting a downward, over center relationship between the rod 42 and the link 28, and for shifting the pintle 34 to that end of the slot 36 remote from the pin 24 upon further retraction of the rod 42 after the section 16 comes to rest on the stand 44. This releasably locks the section 16 against upward movement away from the stand 44, preventing chatter of the section 16 against the stand 44 during travel of the implement while the section 16 is folded.

When the section 16 is to be unfolded, extension of the rod 42 will first align the rod 42 and the link 28 and shift the pintle 34 to the full line position shown in FIG. 6. During initial raising of the section 16 off the stand 44 the assembly 38 will push the section 16 to the position shown in FIG. 5 after which the pintle 34 will remain located in the slot 36 as depicted in FIG. 5, causing the assembly 38 to gently and smoothly lower the section 16 to its operating position.

Normally the spring 50 has no important function during the operations above described, and is not needed, although it does assure proper location of the pintle 34 in the slot 36 during swinging of the section 16 by the assembly 38 as above outlined. However, in the event frame 10 is tilted laterally (as distinguished from its horizontal position shown in FIG. 1) such will have an effect on the attitude of the section 16 when it reaches its center of gravity. Under such conditions, except for the pulling action of spring 50 on the pintle 34 some shock, because of free-fall, could become noticeable as the section 16 commences its descent toward the stand 44. Instead, the pintle 34 remains in the position relative to the slot 37 shown in FIG. 5 and by full lines in FIG. 6 until the rod 42 is fully retracted.

It is important to recognize also that the linkage arrangement of the present invention provides a more uniform mechanical advantage throughout the folding cycle than has heretofore been possible in many other designs. Thus, a smaller hydraulic cylinder may be used than would otherwise be necessary which, in turn, permits those structures which are used to support and attach the cylinders to be less substantial in terms of weight and structural strength. This naturally results in significant manufacturing benefits.

I claim:
1. In a folding implement frame:
   a pair of hingedly interconnected frame sections, one of which is swingable from a generally horizontal operating position in essentially the same horizontal plane as the other section to a folded position disposed in overlying relationship to said other section;
   power means connected to said other section; and
   coupling means operably connecting the power means with said one section for effecting said swinging movement thereof,
   said coupling means including an elongated slot and a transverse pin received therein,
   said slot being so oriented relative to the line of force between the power means and the one section when the latter is in said operating position as to permit the one section to rise and fall freely and independently of the power means to the extent permitted by engagement of the pin against opposite ends of the slot,
   said orientation of the slot further being such that said line of force is at least substantially perpendicular to the longitudinal axis of the slot when the one section is in a raised position approximately midway between said operating and folded positions whereby to prevent free-fall of the one section incurred by the pin moving freely in the slot,
   said coupling means further including an elongated, rigid, push-pull link pivotally connected at one end to said power means and at the opposite end to said one section through said pin and slot, said line of force being transmitted through said rigid link.

2. In an implement as claimed in claim 1, wherein said pin is on said link and the slot is on said one section.

3. In an implement as claimed in claim 1, wherein said coupling means additionally includes a second rigid link pivotally connected between said other section and said one link for enabling the power means to gain a mechanical advantage on the one section.

4. In an implement as claimed in claim 3, wherein the points of connection of the links to their respective sections are located on opposite sides of the axis of swinging movement of the one section.

5. In an implement as claimed in claim 4, wherein said sections are provided with a pair of rigid straps converging upwardly from the sections when the one section is in its operating position, said straps having means pivotally interconnecting the same adjacent their upper ends to define said axis of swinging movement of the one section, said links projecting upwardly from opposite ones of said straps when the one section is in its operating position and being pivotally interconnected above the pivot means between said straps.

6. In an implement as claimed in claim 5, wherein said pin is provided with spring means yieldably biasing the same toward that end of the slot which permits the power means to exert a pulling force on the one section through said pin when the latter is abuttingly engaged thereagainst.

7. In an implement as claimed in claim 3, wherein said power means comprises a double-acting, fluid pressure operated, piston and cylinder assembly, said assembly being operable to lift said one section as it swings from said operating position to said raised position and to restrain said one section as it descends from said raised position to said folded position.

8. In an implement as claimed in claim 7; and a stand on said other section disposed to support said one section from beneath the same when the one section is in said folded position.

9. In an implement as claimed in claim 8, wherein said assembly is disposed for effecting an over center relationship between the piston rod of said assembly and the link of said one section and for shifting said pin against a remote end of the slot upon further retraction of the piston after the one section comes to rest on the stand whereby to releasably lock the one section against upward movement away from the stand.

10. In a folding implement frame:
a pair of hingedly interconnected frame sections, one of which is swingable from a generally horizontal operating position in essentially the same horizontal plane as the other section to a folded position disposed in overlying relationship to said other section;

power means connected to said other section; and coupling means operably connecting the power means with said one section for effecting said swinging movement thereof, said coupling means including an elongated slot and a transverse pin received therein, said slot being so oriented relative to the line of force between the power means and the one section when the latter is in said operating position as to permit the one section to rise and fall freely and independently of the power means to the extent permitted by engagement of the pin against opposite ends of the slot, said orientation of the slot further being such that said line of force is at least substantially perpendicular to the longitudinal axis of the slot when the one section is in a raised position approximately midway between said operating and folded positions whereby to prevent free-fall of the one section incurred by the pin moving freely in the slot, said pin being provided with spring means yieldably biasing the same toward that end of the slot which permits the power means to exert a pulling force on the one section through said pin when the latter is abuttingly engaged thereagainst.

* * * * *

Notice of Adverse Decision in Interference

In Interference No. 101,464, involving Patent No. 4,512,416, D. R. Smith, FLAT FOLD IMPLEMENT FRAME, final judgment adverse to the patentee was rendered June 3, 1986, as to claim 1.

[*Official Gazette August 12, 1986.*]